United States Patent
Cresci et al.

(10) Patent No.: US 11,886,749 B2
(45) Date of Patent: Jan. 30, 2024

(54) INTERRUPT MODE OR POLLING MODE FOR MEMORY DEVICES

(71) Applicant: Micron Technology, Inc., Boise, ID (US)

(72) Inventors: Federica Cresci, Milan (IT); Nicola Del Gatto, Cassina de' Pecchi (IT); Massimiliano Turconi, Gorgonzola (IT); Massimiliano Patriarca, Milan (IT)

(73) Assignee: Micron Technology, Inc.

( * ) Notice: Subject to any disclaimer, the term of this patent is extended or adjusted under 35 U.S.C. 154(b) by 0 days.

(21) Appl. No.: 18/089,010

(22) Filed: Dec. 27, 2022

(65) Prior Publication Data

US 2023/0205462 A1   Jun. 29, 2023

Related U.S. Application Data

(63) Continuation of application No. 17/169,124, filed on Feb. 5, 2021, now Pat. No. 11,561,733.

(51) Int. Cl.
*G06F 12/00* (2006.01)
*G06F 3/06* (2006.01)
*G06F 12/02* (2006.01)

(52) U.S. Cl.
CPC .......... *G06F 3/0659* (2013.01); *G06F 3/0613* (2013.01); *G06F 3/0656* (2013.01); *G06F 3/0683* (2013.01); *G06F 12/0246* (2013.01)

(58) Field of Classification Search
CPC .... G06F 3/0659; G06F 3/0613; G06F 3/0656; G06F 3/0683; G06F 12/0246

(Continued)

(56) References Cited

U.S. PATENT DOCUMENTS

| 8,554,968 | B1 | 10/2013 | Onufryk et al. |
| 2011/0023040 | A1 | 1/2011 | Hendry et al. |

(Continued)

FOREIGN PATENT DOCUMENTS

| CN | 1956438 A | 5/2007 |
| CN | 201716564 U | 1/2011 |

(Continued)

OTHER PUBLICATIONS

Chinese Patent Office, "Office Action," issued in connection with Chinese Patent Application No. 202210116795.7 dated Apr. 1, 2023 (22 pages with translation).

*Primary Examiner* — Mardochee Chery
(74) *Attorney, Agent, or Firm* — Holland & Hart LLP

(57) ABSTRACT

Methods, systems, and devices for event management for memory devices are described. A memory system may include a frontend (FE) queue and a backend (BE). Each queue may include an interface that can be operated in an interrupt mode or a polling mode based on certain metrics. For example, the interface associated with the FE queue may be operated in a polling mode or an interrupt mode based on whether a quantity of commands being executed on one or more memory devices of the memory system satisfies a threshold value. Additionally or alternatively, the interface associated with the BE queue may be operated in a polling mode or an interrupt mode based on whether a quantity of active logical block addresses (LBAs) associated with one or more operations being executed on one or more memory devices of the memory system satisfies a threshold value.

20 Claims, 8 Drawing Sheets

(58) Field of Classification Search
USPC .......................................................... 711/154
See application file for complete search history.

(56) References Cited

U.S. PATENT DOCUMENTS

| | | |
|---|---|---|
| 2014/0189212 A1 | 7/2014 | Slaight et al. |
| 2016/0259553 A1* | 9/2016 | Buxton ................. G06F 3/0688 |
| 2017/0242594 A1 | 8/2017 | Liu et al. |
| 2019/0361708 A1 | 11/2019 | Soe et al. |
| 2021/0263864 A1 | 8/2021 | Hanna et al. |
| 2021/0397563 A1 | 12/2021 | Chen |

FOREIGN PATENT DOCUMENTS

| | | | |
|---|---|---|---|
| CN | 105376218 | * | 3/2016 |
| CN | 112204524 A | | 1/2021 |

* cited by examiner

INTERRUPT MODE OR POLLING MODE FOR MEMORY DEVICES

CROSS REFERENCE

The present Application for Patent is a continuation of U.S. patent application Ser. No. 17/169,124 by Cresci et al., entitled "INTERRUPT MODE OR POLLING MODE FOR MEMORY DEVICES," filed Feb. 5, 2021, assigned to the assignee hereof, and is expressly incorporated by reference in its entirety herein.

FIELD OF TECHNOLOGY

The following relates generally to one or more systems for memory and more specifically to event management for memory devices.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
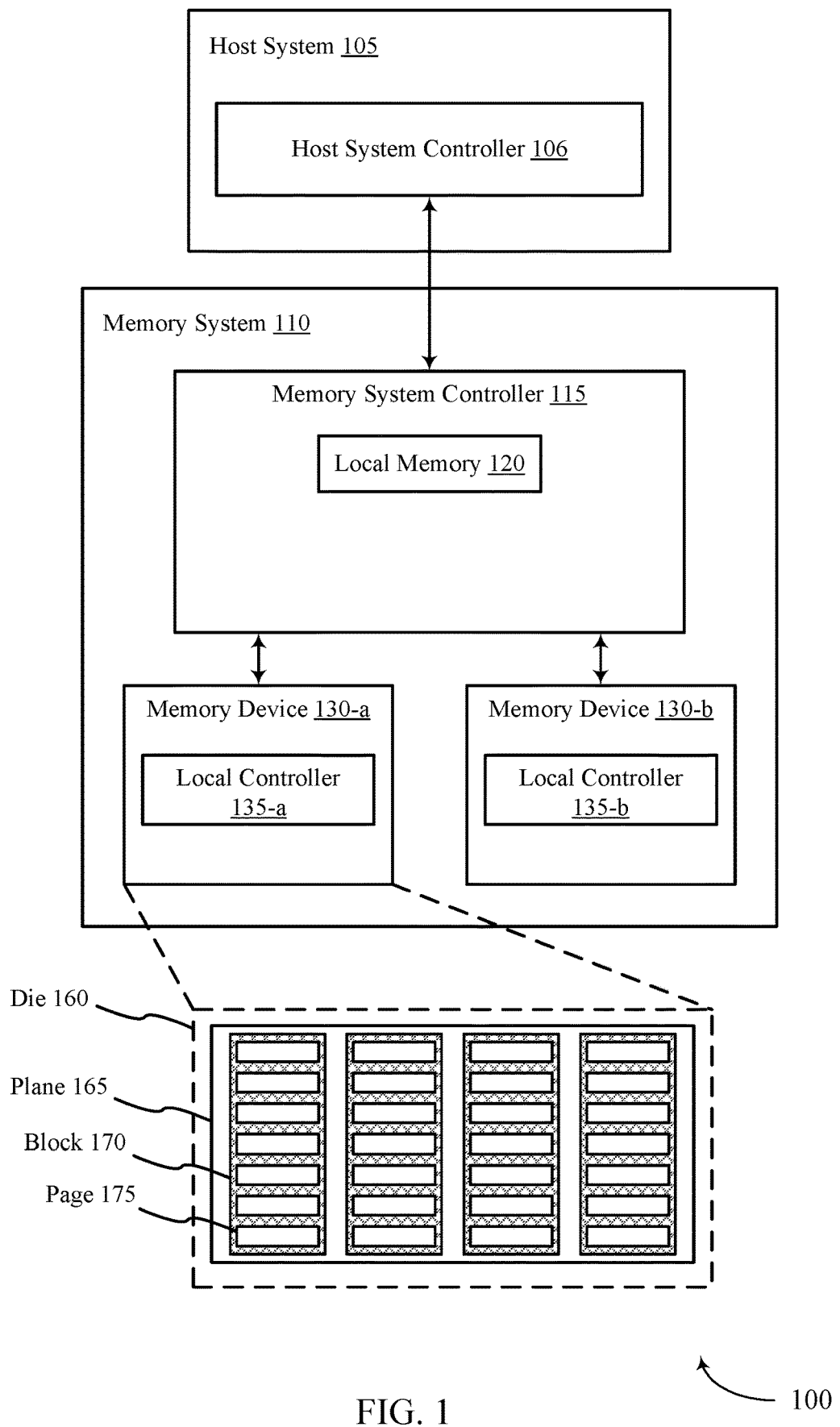
FIG. 1 illustrates an example of a system that supports event management for memory devices in accordance with examples as disclosed herein.

Emerging memories can be advantageous for managed memory systems because of their low latency. Managed memory systems may generally perform two types of operations: foreground traffic associated with external input/output (I/O) operations and background traffic for maintenance operations. Managed memory systems typically have an architecture with both hardware and software (e.g., running on a processor or controller) to manage memory commands and data routing between a front end (FE) that interfaces with the host system and a back end (BE) that interfaces with the storage memory. The FE may handle the protocol interface to the host and moving data between the host and internal data buffers, while the BE may move the data between the internal data buffers and the storage memory. Communication between the hardware and software (e.g., firmware) may be managed via queues (e.g., hardware queues), in which commands are stored while not in execution by the software.

Commands sent from a host system may be managed by FE submission queues (SQs), while responses to the host system may be managed by FE completion queues (CQs). A similar logic is implemented for managing SQs and CQs in the BE. The usage of interrupt request (IRQ) or polling event management techniques are commonly used in managed memory systems employing traditional storage memory technologies, such as flash-based devices. Generally for traditional storage memory, the duration for polling or IRQ management may be lower than the duration needed for accessing the storage memory. When storage memory is replaced with lower-latency devices such as emerging memory, reducing the time consumed by polling or IRQ management becomes critical in order to take advantage of the low-latency of the memory devices. Accordingly, enhanced techniques for managing polling or IRQ events in memory systems to take advantage of low-latency memory devices may be desirable.

A memory system employing enhanced techniques for managing polling and IRQ events is described herein. For example, the memory system described herein may be configured to implement both IRQ and polling event management techniques to improve system performance independently of the host workload traffic. The techniques include switching between IRQ and polling based on metrics of commands currently in execution in the software. For example, the host system side (e.g., queue in the FE) may be switched between IRQ and polling based on the number of active commands in execution. The storage side (e.g., queue in the BE) may be switched between IRQ and polling based on the number of logical block addresses (LBAs) that are the subject of I/O commands in execution. By switching between IRQ and polling event management—both in the FE queue and BE queue—the memory system may reduce the time consumed for managing polling or IRQ and thus take advantage of the low-latency of the emerging memory.

Features of the disclosure are initially described in the context of systems as described with reference to FIGS. 1 and 2. Features of the disclosure are described in the context of process flow diagrams as described with reference to FIGS. 3-6. These and other features of the disclosure are further illustrated by and described with reference to an apparatus diagram and flowchart that relate to event management for memory devices as described with reference to FIGS. 7 and 8.

FIG. 1 is an example of a system 100 that supports event management for memory devices in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, SATA controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a serial advanced technology attachment (SATA) interface, a UFS interface, an eMMC interface, a peripheral component interconnect express (PCIe) interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

Memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, where memory system 110 includes more than one memory device 130, different memory devices 130 within memory system 110 may include the same or different types of memory cells.

The memory system controller 115 may be coupled with and communicate with the host system 105 (e.g., via the physical host interface), and may be an example of a control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130, and other such operations, which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. And in some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM). Additionally or alternatively, a memory device 130 may include one or more arrays of volatile memory cells. For example, a memory device 130 may include random access memory (RAM) memory cells, such as dynamic RAM (DRAM) memory cells and synchronous DRAM (SDRAM) memory cells.

In some examples, a memory device 130 may include (e.g., on a same die or within a same package) a local controller 135, respectively, which may execute operations on one or more memory cells of the memory device 130. A local controller 135 may operate in conjunction with a memory system controller 115 or may perform one or more functions ascribed herein to the memory system controller 115.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support event management for memory devices. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, e.g., one or more memory arrays and related circuitry combined with a local (e.g., on-die or in-package) controller (e.g., local controller 135). An example of a managed memory system is a managed memory system which may be a managed NAND (MNAND) system or a managed memory system employing an emerging memory technology with reduced latency compared to NAND memory.

In some examples, the memory system 110 may include one or more queues (not shown) for managing commands received by the host system 105 and responses to be transmitted to the host system 105. For example, the memory system 110 may include a FE SQ and a FE CQ. In some examples, the queues may be located in the local memory 120 (e.g., the FE SQ and the FE CQ may correspond to one or more memory cells of the local memory 120) or another portion of the memory system 110. Additionally or alternatively, the memory system 110 may include a BE SQ and a BE CQ. In some examples, the BE SQ and the BE CQ may be located in the local memory 120 (e.g., the BE SQ and the BE CQ may correspond to one or more memory cells of the local memory 120) or another portion of the memory system 110.

The FE queues and the BE queues may be switched between IRQ and polling based on metrics. For example, the FE queues may be switched between IRQ and polling (e.g., an interface coupled with the FE queues may be operated in an interrupt mode or a polling mode) based on a quantity of commands currently in execution by the memory system 110. Additionally or alternatively, the BE queues may be switched between IRQ and polling (e.g., an interface coupled with the BE queues may be operated in an interrupt mode or a polling mode) based on a quantity of LBAs that are the subject of I/O commands in execution. By switching between IRQ and polling event management—in either or both of the FE queue or BE queue—the memory system 110 may reduce the time consumed for managing polling or IRQ and thus take advantage of the low-latency of the memory device 130-a.

Figure 2:
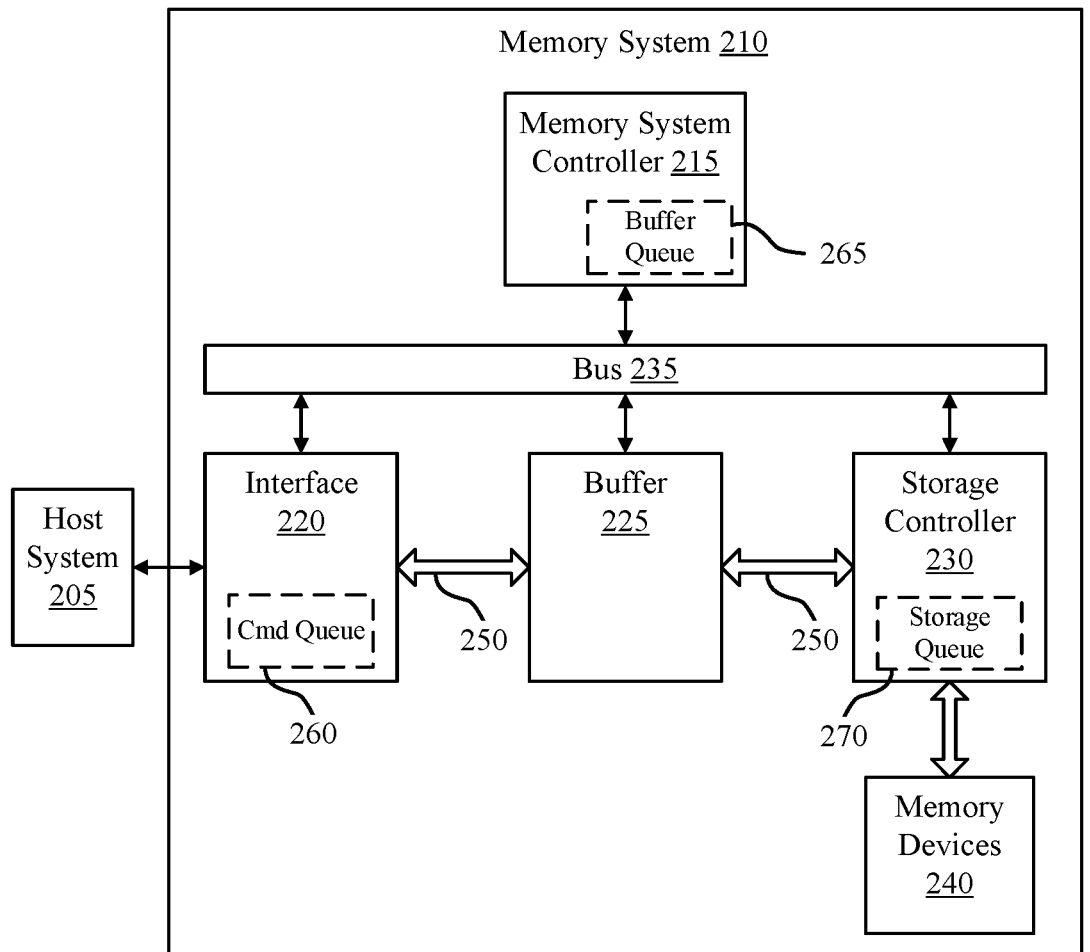
FIG. 2 illustrates an example of a system that supports event management for memory devices in accordance with examples as disclosed herein.

FIG. 2 illustrates an example of a memory device 200 that supports event management for memory devices in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of system 100 as described with reference to FIG. 1. For example, the memory system 210 and the host system 205 may be examples of the memory system 110 and the host system 105, respectively.

Memory system 210 may include memory devices 240 to store data transferred between memory system 210 and the host system 205, e.g., in response to receiving access commands from the host system 205, as described below. The memory devices 240 may include one or more memory devices as described with reference to FIG. 1. For example, the memory devices 240 may include NAND memory, PCM, self-selecting memory, 3D XPoint, other chalcogenide-based memories, FERAM, MRAM, NOR (e.g., NOR flash) memory, STT-MRAM, CBRAM, RRAM, or OxRAM.

Memory system 210 may include a storage controller 230 for controlling the passing of data directly to and from the memory devices 240, e.g., for storing data, retrieving data, and determining memory locations in which to store data and from which to retrieve data. Storage controller 230 may communicate with memory devices 240 directly or via a bus (not shown) using a protocol specific to each type of memory device. In some cases, a single storage controller 230 may be used to control multiple memory devices of the same or different types. In some cases, memory system 210 may include multiple storage controllers 230, e.g., a different storage controller 230 for each type of memory device 240. In some cases, storage controller 230 may implement aspects of a local controller 135 as described with reference to FIG. 1.

Memory system 210 may additionally include an interface 220 for communication with the host system 205 and a buffer 225 for temporary storage of data being transferred between the host system and the memory devices 240. Interface 220, buffer 225, and storage controller 230, may be for translating data between the host system 205 and the memory devices 240, e.g., as shown by data path 250, and may be collectively referred to as data path components.

Using buffer 225 to temporarily store data during transfers may allow data to be buffered as commands are being processed, thereby reducing latency between commands and allowing arbitrary data size associated with commands. This may also allow bursts of commands to be handled and the buffered data may be stored or transmitted (or both) once a burst has stopped. Buffer 225 may include relatively fast memory (e.g., some types of volatile memory, such as SRAM or DRAM) or hardware accelerators or both to allow fast storage and retrieval of data to and from buffer 225. Buffer 225 may include data path switching components for bi-directional data transfer between buffer 225 and other components.

The temporary storage of data within buffer 225 may refer to the storage of data in buffer 225 during the execution of access commands. That is, upon completion of an access command, the associated data may no longer be maintained in buffer 225 (e.g., may be overwritten with data for additional access commands). In addition, buffer 225 may be a non-cache buffer. That is, data may not be read directly from buffer 225 by the host system 205. For example, read commands may be placed on a queue without an operation to match the address to addresses already in the buffer (e.g., without a cache address match or lookup operation).

Memory system 210 may additionally include a memory system controller 215 for executing the commands received from the host system 205 and controlling the data path components in the moving of the data. Memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by memory system 210. Command queue 260, buffer queue 265, and storage queue 270 are depicted at interface 220, memory system controller 215 and storage controller 230, respectively, as examples of a possible implementation. Queues, if used, may be positioned anywhere within memory system 210. Command queue 260 and storage queue 270 may be hardware queues (e.g., implemented as registers or dedicated memory), while buffer queue 265 may be a software queue (e.g., implemented within software of memory system controller 215).

Data transferred between the host system 205 and the memory devices 240 may take a different path in memory system 210 than non-data information (e.g., commands, status information). For example, the system components in memory system 210 may communicate with each other using bus 235, while the data may use data path 250 through the data path components instead of bus 235. Memory system controller 215 may control how and if data is transferred between the host system 205 and the memory devices 240 by communicating with the data path components over bus 235 (e.g., using a protocol specific to memory system 210).

If a host system 205 transmits access commands to memory system 210, the commands may be received by interface 220, e.g., according to a protocol (e.g., a universal flash storage (UFS) protocol or an eMMC protocol). Thus, interface 220 may be considered a front end of memory system 210. Upon receipt of each access command, interface 220 may communicate the command to memory system controller 215, e.g., via bus 235. In some cases, each command may be added to command queue 260 by interface 220 to communicate the command to memory system controller 215.

Memory system controller 215 may determine that an access command has been received based on communication (e.g., according to IRQ or polling) from interface 220. In some cases, memory system controller 215 may determine the access command has been received by retrieving the command from command queue 260. The command may be removed from command queue 260 after it has been retrieved therefrom, e.g., by memory system controller 215. In some cases, memory system controller 215 may cause interface 220, e.g., via bus 235, to remove the command from command queue 260.

Commands may be moved to buffer queue 265 for execution. For a read command, this may mean obtaining data from the memory devices 240 and transmitting the data to the host system 205. For a write command, this may mean receiving data from the host system 205 and moving the data to the memory devices 240. Memory system controller 215 may perform address translation between LBAs and physical addresses in the memory devices 240. For example, memory system controller 215 may use a logical-to-physical (L2P) table to map LBAs to physical addresses. The L2P table may be stored in memory devices 240, and regions of the L2P table may be retrieved (e.g., via storage controller 230) and stored locally (e.g., in a cache memory) by memory system controller 215.

In either case, memory system controller 215 may use buffer 225 for, among other things, temporary storage of the data being received from or sent to the host system 205. Buffer 225 may be considered a middle end of memory system 210. In some cases, buffer address management (e.g., pointers to address locations in the buffer) may be performed by hardware (e.g., dedicated circuits) in the interface 220, buffer 225, or storage controller 230.

To process a write command received from the host system 205, memory system controller 215 may first determine if buffer 225 has sufficient available space to store the data associated with the command. For example, memory system controller 215 may determine, e.g., via firmware (e.g., controller firmware), an amount of space within buffer 225 that may be available to store data associated with the write command.

In some cases, buffer queue 265 may be used to control flow of commands associated with data stored in buffer 225 including write commands. Buffer queue 265 may include the access commands associated with data currently stored in buffer 225. In some cases, the commands in command queue 260 may be moved to buffer queue 265 by memory system controller 215 and may remain in buffer queue 265 while the associated data is stored in buffer 225. In some cases, each command in buffer queue 265 may be associated with an address at buffer 225. That is, pointers may be maintained that indicate where in buffer 225 the data associated with each command is stored. Using buffer queue 265, multiple access commands may be received sequentially from the host system 205 and at least portions of the access commands may be processed concurrently (e.g., the commands may be in various stages of being processed at the same time).

If buffer 225 has sufficient space to store the write data, memory system controller 215 may cause interface 220 to transmit an indication of availability to the host system 205 (e.g., a "ready to transfer" indication), e.g., according to a protocol (e.g., a UFS protocol or an eMMC protocol). As interface 220 subsequently receives from the host system 205 the data associated with the write command, interface 220 may transfer the data to buffer 225 for temporary storage using data path 250. In some cases, interface 220 may obtain from buffer 225 or buffer queue 265 the location within buffer 225 to store the data. Interface 220 may indicate to memory system controller 215, e.g., via bus 235, that the data transfer to buffer 225 has been completed.

Once the write data has been stored in buffer 225 by interface 220, the data may be transferred out of buffer 225 and stored in a memory device 240. This may be done using storage controller 230. For example, memory system controller 215 may cause storage controller 230 to retrieve the data out of buffer 225 using data path 250, and transfer the data to a memory device 240. Storage controller 230 may be considered a back end of memory system 210. Storage controller 230 may indicate to memory system controller 215, e.g., via bus 235, that the data transfer to a memory device of the memory devices 240 has been completed.

In some cases, storage queue 270 may be used to aid with the transfer of write data. For example, memory system controller 215 may push (e.g., via bus 235) write commands from buffer queue 265 to storage queue 270 for processing. Storage queue 270 may include entries for each access command, and may include, e.g., a buffer pointer (e.g., an address) that may indicate where in buffer 225 the data associated with the command is stored and a storage pointer (e.g., an address) that may indicate the location in the memory devices 240 associated with the data. In some cases, storage controller 230 may obtain from buffer 225, buffer queue 265, or storage queue 270 the location within buffer 225 from which to obtain the data. Storage controller 230 may manage the locations within the memory devices 240 to store the data (e.g., performing aspects of wear-leveling, garbage collection, and the like). The entries may be added to storage queue 270, e.g., by memory system controller 215. The entries may be removed from the storage queue 270, e.g., by storage controller 230 or memory system controller 215 upon completion of the transfer of the data.

To process a read command received from the host system 205, memory system controller 215 may again first determine if buffer 225 has sufficient available space to store the data associated with the command. For example, memory system controller 215 may determine, e.g., via firmware (e.g., controller firmware), an amount of space within buffer 225 that may be available to store data associated with the read command.

In some cases, buffer queue 265 may be used to aid with buffer storage of data associated with read commands in a similar manner as discussed above with respect to write commands. For example, if buffer 225 has sufficient space to store the read data, memory system controller 215 may cause storage controller 230 to retrieve the data associated with the read command from a memory device 240 and store the data in buffer 225 for temporary storage using data path 250. Storage controller 230 may indicate to memory system controller 215, e.g., via bus 235, that the data transfer to buffer 225 has been completed.

In some cases, storage queue 270 may be used to aid with the transfer of read data. For example, memory system controller 215 may push the read command to storage queue 270 for processing. In some cases, storage controller 230 may obtain from buffer 225 or storage queue 270 the location within the memory devices 240 from which to retrieve the data. In some cases, storage controller 230 may obtain from buffer queue 265 the location within buffer 225 to store the data. In some cases, storage controller 230 may obtain from storage queue 270 the location within buffer 225 to store the data. In some cases, memory system controller 215 may move the command processed by storage queue 270 back to command queue 260.

Once the data has been stored in buffer 225 by storage controller 230, the data may be transferred out of buffer 225 and sent to the host system 205. For example, memory system controller 215 may cause interface 220 to retrieve the data out of buffer 225 using data path 250 and transmit the data to the host system 205, e.g., according to a protocol (e.g., a universal flash storage (UFS) protocol or an eMMC protocol). For example, the interface 220 may process the command from command queue 260 and may indicate to memory system controller 215, e.g., via bus 235, that the data transmission to the host system 205 has been completed.

Memory system controller 215 may execute received commands according to an order (e.g., a first-in, first-out order, according to the order of the command queue 260). For each command, memory system controller 215 may cause data corresponding to the command to be moved into and out of buffer 225, as discussed above. As the data is moved into and stored within buffer 225, the command may remain in buffer queue 265. A command may be removed from buffer queue 265, e.g., by memory system controller 215, if the processing of the command has been completed (e.g., if data corresponding to the access command has been transferred out of buffer 225). If a command is removed from buffer queue 265, the address previously storing the data associated with that command may be available to store data associated with a new command.

Memory system controller 215 may additionally be configured for operations associated with the memory devices 240. For example, memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may be noncontiguous physical block addresses. In some cases, storage controller 230 may be configured to perform one or more of the above operations in conjunction with or instead of memory system controller 215. In some cases, memory system controller 215 may perform the functions of storage controller 230 and storage controller 230 may be omitted.

As described herein, the memory system 210 may receive commands from the host system 205. In particular, the interface 220 of the memory system 210 may receive commands, and the commands may be stored (e.g., temporarily stored) to the command queue 260. The command queue 260 may include or be an example of a FE SQ and a FE CQ. When a command is received from the host system 205 and stored to the command queue 260, the memory system controller 215 may determine whether to operate an interface between command queue 260 and memory system controller 215 in an interrupt mode or in a polling mode.

The memory system controller 215 may (e.g., upon fetching or completing commands), determine whether a quantity of active commands (e.g., commands currently being processed by the memory system controller 215) being processed satisfies a threshold value. If the quantity of commands satisfies the threshold value, the memory system controller 215 may operate the interface for command queue 260 in a polling mode. When operating in the polling mode, the memory system controller 215 may not be immediately notified when new commands are placed in command queue 260, and may instead determine if new commands have been placed in command queue 260 by performing a polling operation (e.g., periodically or when other operations are complete). If the quantity of commands does not satisfy the threshold value, the memory system controller 215 may operate the interface for command queue in an interrupt mode. When operating in the interrupt mode, the memory system controller 215 may be notified via an interrupt signal when a new command has been placed on the command queue 260. The interrupt signal may initiate an interrupt handling routine at the memory system controller 215, which may pause execution on any commands currently being executed and initiate processing for the new command. The memory system controller 215 may then maintain the commands that were currently being executed and the new command in parallel (e.g., as separate processes or threads that are active at the same time).

Additionally or alternatively, commands may be performed on one or more of the memory devices 240 and, in response to the command(s) being completed, a response may be provided to the host system 205. In some examples, the responses may be stored (e.g., temporarily stored) to the storage queue 270. The storage queue 270 may include or be an example of a BE SQ and a BE CQ and may include an interface between the storage queue 270 and the memory system controller 215. The memory system controller 215 may operate the interface in an interrupt mode or in a polling mode based on a quantity of LBAs that are the subject of I/O commands in execution (e.g., in execution by the memory system controller 215).

The memory system controller 215 may determine whether a quantity of LBAs that are the subject of I/O commands in execution (e.g., a quantity of LBAs associated with access operations being performed on one or more of the memory devices 240) satisfies a threshold value. If the quantity of LBAs satisfies the threshold value, the memory system controller 215 may operate the interface (e.g., the interface associated with the storage queue 270) in a polling mode. When operating in the polling mode, the memory system controller 215 may not be immediately notified when new responses are placed in the storage queue 270, and may instead determine if new responses have been placed in the storage queue 270 by performing a polling operation (e.g., periodically or when other operations are complete). Thus the memory system controller 215 may determine whether a response (e.g., a response to be transmitted to the host system 205) is stored to the storage queue 270 and transmit the response at a later time. If the quantity of LBAs does not satisfy the threshold value, the memory system controller 215 may operate the interface (e.g., the interface associated with the storage queue 270) in an interrupt mode. When operating in the interrupt mode, the interface for storage queue 270 may send an interrupt to memory system controller 215 when a new command (e.g., response) is in the storage queue 270. The memory system controller 215 may suspend executing a command (e.g., a command associated with one or more of the memory devices 240) to determine how to handle the interrupt. For example, the memory system controller 215 may, after suspending executing the command, resume executing the command but may execute the command (or a portion of the command) in parallel with transmitting a response to the host system 205. By switching between interrupt and polling event management—in either or both of the command queue 260 or the storage queue 270—the memory system 210 may reduce the time consumed for managing polling or IRQ and thus take advantage of the low-latency of the memory devices 240.

FIG. 1 illustrates an example of a process flow diagram 100 that supports event management for memory devices in accordance with examples as disclosed herein. In some examples, the process flow diagram 300 may illustrate one or more operations performed by a controller (e.g., via firmware of a memory system controller 215 as described with reference to FIG. 2) for determining whether to operate an interface of a FE queue (e.g., an interface between the command queue 260 and the memory system controller 215 as described with reference to FIG. 2) in a polling mode or in an interrupt mode. The controller may be configured to switch the interface between an interrupt mode and a polling mode, which may reduce the time consumed by the associated memory system, and thus take advantage of the low latency of the memory devices (e.g., the memory devices 240 as described with reference to FIG. 2) associated with the memory system.

As described herein, a memory system may include a FE queue that includes a FE SQ and a FE CQ. In some examples, the queues may be associated with different physical elements such as registers or memory cells. For example, the FE SQ and FE CQ may be associated with different memory cells of a block of memory cells that are configured as temporary storage. The memory system may include memory configured for storage (e.g., storage memory) and may receive commands for the storage memory from a host system (e.g., a host system 205 as described with reference to FIG. 2). When the memory system receives a command (e.g., a first command), the command may be stored to the FE queue (e.g., the FE SQ) for processing. When the command is executed may depend on whether an interface of the FE queue is operating in an interrupt mode or a polling mode.

When operating in an interrupt mode, the memory controller may receive an interrupt (e.g., an interrupt associated with the command received from the host system) when a new command is present in the FE queue. Upon receiving the interrupt, the memory controller may suspend any commands that are currently being executed. For example, if the memory controller is executing a second command different than the command associated with the interrupt, the memory controller may temporarily pause executing the second command and initiate execution of the command associated with the interrupt. Accordingly, the second command may be "interrupted" such that the first command is at least partially executed before the second command is completed. In some instances, portions of other commands (e.g., commands in addition to the first command) may be executed before the memory controller resumes or completes executing the second command.

When operating in a polling mode, the memory controller may not immediately be notified of the first command (e.g., the memory controller may mask the interrupt handling routine). Instead, the memory controller may periodically poll the FE queue to determine if any new commands are present upon the occurrence of one or more trigger events. For example, the memory controller may poll the FE queue upon the expiration of a timer (e.g., a polling timer) that is set to a predefined duration. In other examples, the memory controller may poll the FE queue upon completing executing the second command (e.g., upon completing executing a command that is being executed when the first command is received). Thus, when operating in a polling mode, the memory controller may continue executing any commands in-execution when the first command is received from the host system and may fetch (and execute) the first command from the FE queue at a later time.

Figure 3:
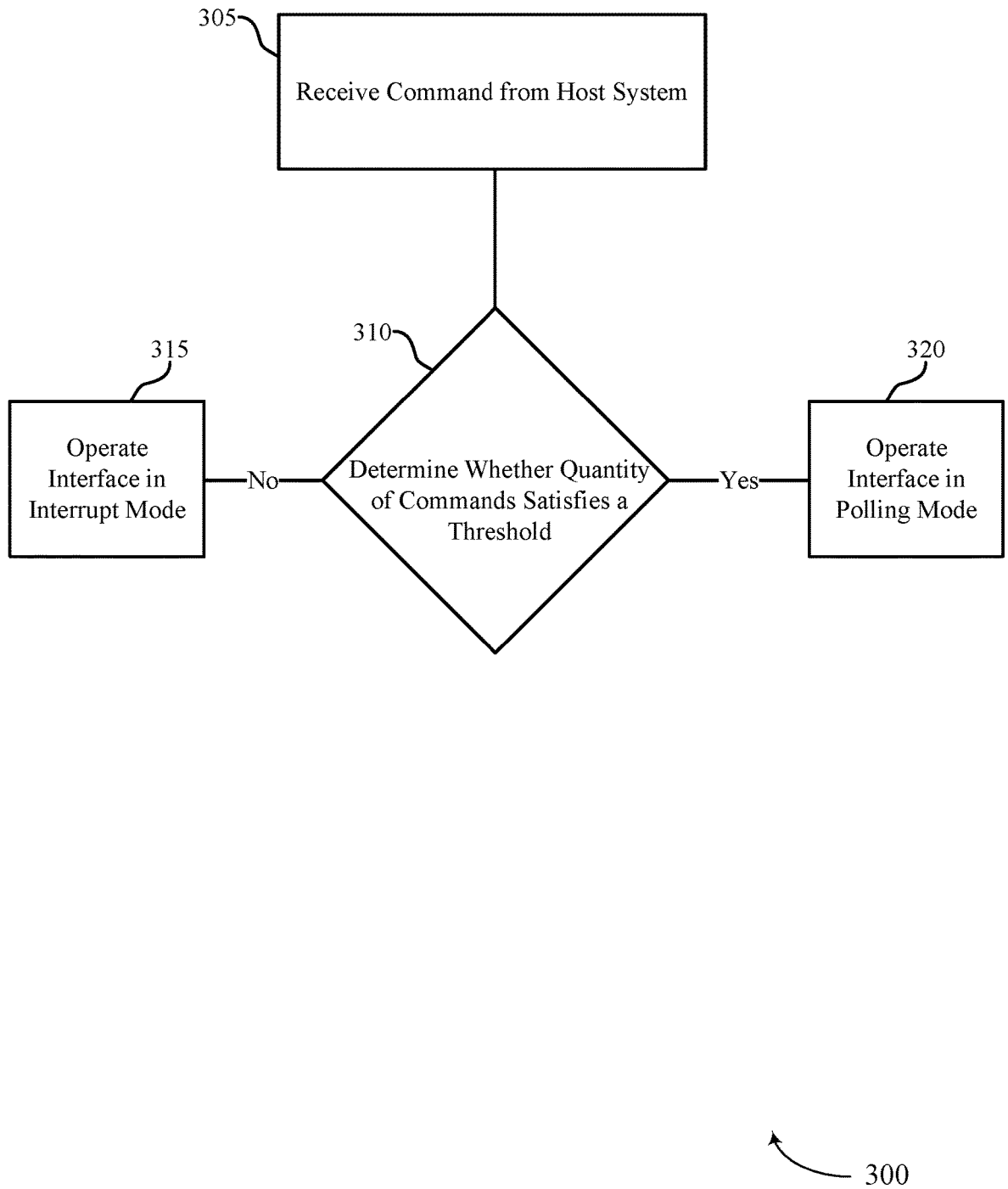
FIGS. 3 through 6 illustrate example process flow diagrams that support event management for memory devices in accordance with examples as disclosed herein.

As illustrated by FIG. 3, at 305 the memory system may receive a command from a host system. As described herein, the command may be associated with operations on one or more logical addresses and may be referred to as a first command. Upon receiving the first command, a memory controller may store the first command to a FE queue (e.g., a FE SQ).

At 310, the memory controller may determine whether a quantity of commands being executed (e.g., being executed by the memory controller) satisfies a threshold value. The threshold value may be a predefined (e.g., preset) value and may be set based on one or more desired performance parameters of the memory system. For example, the threshold value may be set at "1" such that if the quantity of active commands is greater than or equal to 1, the memory controller may operate the interface associated with the FE queue in a polling mode. If the quantity of active commands is less than 1, the memory controller may operate the interface in an interrupt mode. The threshold value of "1" is used for illustrative purposes only, and the threshold value may be set at any positive integer value.

At 315, if the memory controller determines that the quantity of commands being executed does not satisfy the threshold value, the memory controller may operate the interface associated with the FE queue in an interrupt mode. As described herein, when the interface is operated in an interrupt mode, the memory controller may receive an interrupt signal and may suspend (e.g., temporarily suspend) executing a second command (e.g., a command being executed). Upon suspending the second command, the memory controller may execute at least a portion of the first command and before resuming executing the second command.

At 320, if the memory controller determines that the quantity of commands being executed satisfies the threshold value, the memory controller may operate the interface associated with the FE queue in a polling mode. As described herein, when the interface is operated in a polling mode, the memory controller may periodically determine whether commands are stored to the FE queue, and retrieve the command(s) from the FE queue. For example, the memory controller may poll the FE queue after a timer expires or after a command (e.g., a second command) is executed. Upon determining that the first command is present and retrieving the first command from the FE queue, the memory controller may execute the first command (and any other commands fetched from the FE queue).

In some examples, the memory controller may determine to operate the FE queue in a polling mode or an interrupt mode upon receiving a command from the host system (e.g., after receiving each command from the command queue) or upon completion of command execution. Each time a determination is made, the memory controller may operate the interface in the interrupt or polling mode, thus the interface may be configured to switch between interrupt and polling event management. Accordingly, the memory system described herein may reduce the time consumed for managing polling or interrupt event management, and thus take advantage of the low-latency of the memory devices associated with the memory system.

FIG. 2 illustrates an example of a process flow diagram 200 that supports event management for memory devices in accordance with examples as disclosed herein. In some examples, the process flow diagram 400 may illustrate one or more operations performed by a controller (e.g., via firmware of a memory system controller 215 as described with reference to FIG. 2) for determining whether to operate an interface of a BE queue (e.g., an interface associated with the storage queue 270 as described with reference to FIG. 2) in a polling mode or in an interrupt mode. The controller may be configured to switch the interface between an interrupt mode and a polling mode, which may reduce the time consumed by the associated memory system, and thus take advantage of the low latency of the memory devices (e.g., the memory devices 240 as described with reference to FIG. 2) associated with the memory system.

As described herein, a memory system may include a BE queue that includes a BE SQ and a BE CQ. In some examples, the queues may be associated with different physical elements such as registers or memory cells. The memory system may include memory configured for storage (e.g., storage memory) and commands may be performed on one or more memory cells of the storage memory. In response to the command(s) being completed, a memory system may provide a response (e.g., an indication of completion of an access operation) to the host system. In some examples, the indication of completion of an access operation may be stored (e.g., temporarily stored) to the BE queue, and an interface of the BE queue may be operated in an interrupt mode or in a polling mode based on a quantity of LBAs that are the subject of I/O commands in execution (e.g., in execution by the memory system controller). When a response to a command (e.g., a first indication of completion of an access operation) is transmitted to the host system may depend on whether an interface of the BE queue is operating in an interrupt mode or a polling mode.

When operating in an interrupt mode, the memory controller may receive an interrupt (e.g., an interrupt associated with the first indication). Upon receiving the interrupt, the memory controller may suspend any operations being performed on a memory device (or memory devices) of the memory system. For example, if the memory controller is performing a garbage collection operation a memory device, the memory controller may temporarily pause performing the garbage collection operation and perform an interrupt handling routine. The memory controller may process the first indication for transmission to the host system. Accordingly, at least a portion of the garbage collection operation may be "interrupted" and processing of the first indication may be conducted concurrently (e.g., the processes may be active concurrently) with the garbage collection operation. In some instances, other indications (e.g., indications in addition to the first indication) may be processed based on the operations being interrupted.

When operating in a polling mode, the memory controller may not immediately fetch the first indication from the BE queue. Instead, the indication may be stored to the BE queue, and the memory controller may periodically determine whether any indications are stored to the BE queue upon the occurrence of one or more trigger events. For example, the memory controller may determine whether any indication are stored to the BE queue upon the expiration of a timer (e.g., a polling timer) that is set to a predefined duration. In other examples, the memory controller may determine whether any commands are stored to the BE queue upon receiving an additional indication (e.g., a second indication) of completion of a maintenance or access operation. Thus, when operating in a polling mode, the memory controller may continue performing operations that are currently in execution and may fetch (and transmit) the first indication from the BE queue at a later time.

Figure 4:
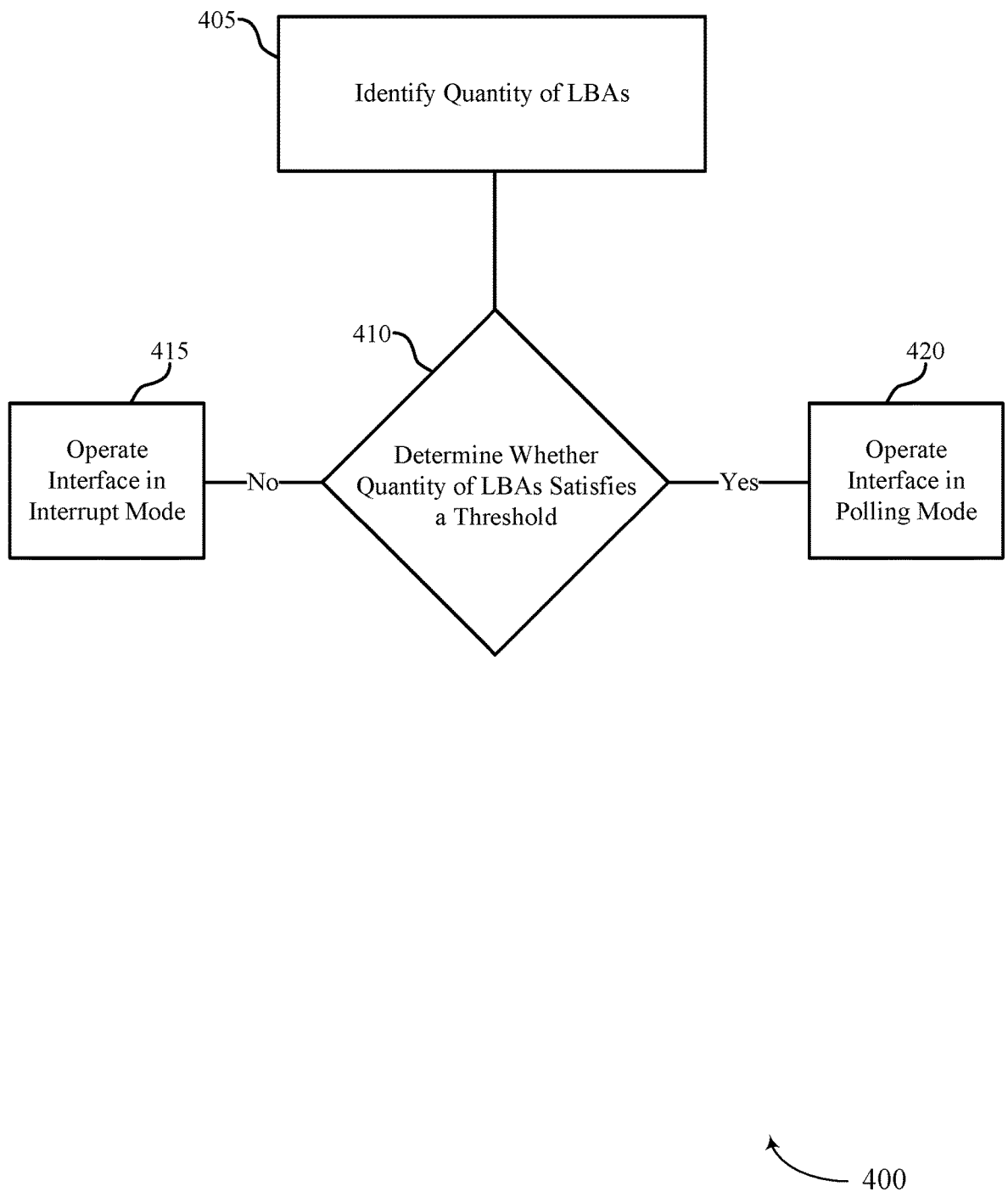
Figure 5:
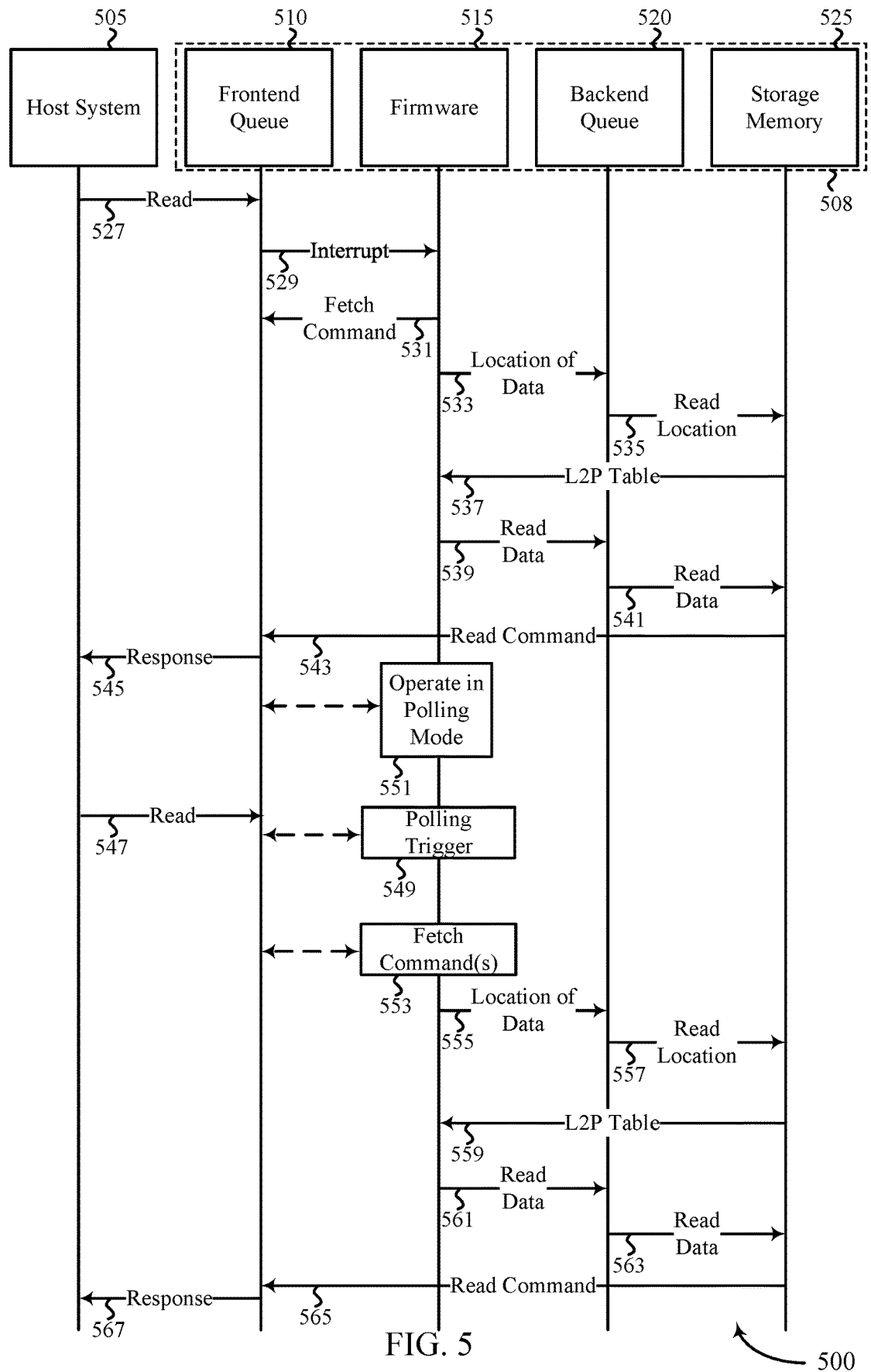

As illustrated by FIG. 4, at 405 the memory system (e.g., a memory controller of the memory system) may determine a quantity of LBAs associated with active operations. As described herein, the LBAs may be associated with operations being performed on one or more memory devices, such as maintenance operations (e.g., garbage collection operations), or may include a quantity of LBAs under execution as part of I/O commands The quantity of LBAs may determine whether an indication (e.g., a first indication) associated with the completion of an access operation is transmitted to a host system according to an interrupt mode or a polling mode.

At 410, the memory controller may determine whether the quantity of LBAs satisfies a threshold value. The threshold value may be a predefined (e.g., preset) value and may be set based on one or more desired performance parameters of the memory system. For example, the threshold value may be set to an integer greater than "1" (e.g., 2, 3, 4, 5, 10, 15) such that if the quantity of LBAs is greater than the threshold value, the memory controller may operate the interface associated with the BE queue in a polling mode. If the quantity of LBAs is less than or equal to the threshold value, the memory controller may operate the interface in an interrupt mode. The threshold value of an integer greater than "1" is used for illustrative purposes only, and the threshold value may be set at any positive integer value.

At 415, if the memory controller determines that the quantity of LBAs does not satisfy the threshold value, the memory controller may operate the interface associated with the BE queue in an interrupt mode. As described herein, when the interface is operated in an interrupt mode, the memory controller may receive an interrupt signal and may suspend (e.g., temporarily suspend) one or more operations on the memory devices of the memory system that are being performed. Upon suspending the operation(s), the memory controller may determine how to handle the interrupt. For example, the memory controller may transmit an indication associated with the interrupt signal (e.g., the first indication) to the host system and may resume performing the operation(s) afterward (e.g., after transmitting the indication and any other indications associated with the interrupt signal), or may resume performing at least a portion of the operations(s) and perform operations related to transmitting at least a portion of the indication to the host system in parallel (e.g., concurrently active processes).

At 420, if the memory controller determines that the quantity of LBAs satisfies the threshold value, the memory controller may operate the interface associated with the BE queue in a polling mode. As described herein, when the interface is operated in a polling mode, the memory controller may periodically determine whether any indications are stored to the BE queue and transmit the indications to a host system. For example, the memory controller may determine that the first indication is stored to the BE queue after a timer expires or after another indication (e.g., a second indication) is received by the BE queue. Upon retrieving the first indication from the BE queue, the memory controller may transmit the first indication (and any other indications fetched from the BE queue) to the host system.

In some examples, the memory controller may determine to operate the BE queue in a polling mode or an interrupt mode upon an access operation being completed (e.g., after every access command or maintenance operation is performed on a memory device of the memory system). Each time a determination is made, the memory controller may operate the interface in the interrupt or polling mode, thus the interface may be configured to switch between interrupt and polling event management.

When operating low latency memory, it may be more efficient to allow processes in execution to complete because they will generally be shorter (e.g., shorter than processes that have not yet been executed). That is, when a relatively large quantity of operations are in execution (e.g., when a threshold quantity of operations are in execution), it may not be desirable to operate low latency memory in an interrupt mode due to the time needed to switch from one process to another. Conversely, when a relatively low quantity of operations are in execution, operating the memory system in an interrupt mode may provide for faster service. Accordingly, the memory system described herein may reduce the time consumed for managing polling or interrupt event management, and thus take advantage of the low-latency of the memory devices associated with the memory system.

FIG. 3 illustrates an example of a process flow diagram 300 that supports event management for memory devices in accordance with examples as disclosed herein. In some examples, the process flow diagram 500 may illustrate one or more operations performed by a host system 505 (e.g., a host system 205 as described with reference to FIG. 2) and a memory system 508 including a frontend queue 510, firmware 515 (e.g., firmware of a memory system controller 215 as described with reference to FIG. 2), a backend queue 520, and storage memory 525 (e.g., storage memory of one or more memory devices 240 as described with reference to FIG. 2). The process flow diagram 500 may illustrate operating an interface of the frontend queue 510 or an interface of the backend queue 520 in a polling mode or in an interrupt mode. The firmware 515 may be configured to switch the interface between an interrupt mode and a polling mode, which may reduce the time consumed by the associated memory system, and thus take advantage of the low latency of the storage memory 525 (e.g., the low latency of the memory devices associated with the storage memory 525).

At 527, the host system 505 may transmit a first read command to the memory system 508, which may be placed in frontend queue 510. The read command may be for data that is stored to the storage memory 525. As described herein, an interface of the frontend queue 510 may be operated according to an interrupt mode or a polling mode, thus the read command may be processed according to an interrupt mode or a polling mode.

At 529, the frontend queue 510 may transmit an interrupt (e.g., a signal indicating an interrupt) to the firmware 515. For exemplary purposes, the memory system 508 may be operating in an interrupt mode prior to 529 based on one or more metrics. For example, when the command was received (and stored to the frontend queue 510), the firmware 515 may have determined whether a quantity of commands being executed (e.g., being executed by the firmware 515) satisfied a threshold value. The firmware 515 may thus have determined that the quantity of commands being executed did not satisfy the threshold value, and the interface may be operating in an interrupt mode.

At 531, the firmware 515 may fetch (e.g., retrieve) the first read command from the frontend queue 510 based on receiving the interrupt signal (e.g., at 529). For example, the firmware 515 may suspend (e.g., temporarily suspend) executing at least a portion of one or more commands and may retrieve the first read command based on suspending at least a portion of one or more commands.

At 533, the firmware 515 may transmit a signal to the backend queue 520 to determine a location of data associated with the first read command. For example, the firmware 515 may include one or more locally stored regions of an L2P table. However, an LBA associated with the first read command may not be included in the locally stored region of the L2P table. Accordingly, the firmware 515 may transmit the signal to the backend queue 520 to read a portion of the L2P table stored to the storage memory 525.

At 535, the signal may be communicated from the backend queue 520 to the storage memory 525 to read the portion of the L2P table stored to the storage memory 525. At 537, the storage memory 525 may transmit signaling to the firmware 515 that includes the portion of the L2P table that includes the LBA associated with the first read command. The firmware 515 may use the portion of the L2P table to determine a mapping between the LBA of the first read command and a physical address of the storage memory 525.

At 539, the firmware 515 may transmit a signal to the backend queue 520 to read data from the storage memory 525 based the portion of the L2P table transmitted to the firmware 515 (e.g., at 537). For example, the firmware 515 may transmit a signal to the backend queue 520 for reading a physical location of the storage memory 525 in response to determining a physical address of the data (e.g., determined based on receiving the L2P table at 537). At 541, the signal may be communicated from the backend queue 520 to the storage memory 525 to read the data. Data may be read from the physical address of the storage memory 525 and may be stored (e.g., temporarily stored) to a buffer.

At 543, the read command may be returned to the frontend queue 510 (e.g., a CQ of the frontend queue 510). In some examples, the read command may be stored (e.g., temporarily stored; posted) to the backend queue 520 before being returned to the frontend queue 510. Upon being stored to the backend queue 520, the response may be returned to the frontend queue 510 via the firmware 515. Thus, although the read command is illustrated as being returned from the storage memory 525 to the frontend queue 510 directly (e.g., without any intervening steps), the read command may be returned via the backend queue 520 and/or the firmware 515.

At 545, a response that includes the data read from the storage memory 525 may be transmitted to the host system 505, which may satisfy the first read command. Although illustrated as coming from the frontend queue 510, the response may come from the firmware 515 based on the response in the backend queue 520. For example, the data may be transmitted to the host system 505 from a buffer (not shown). In some examples, the response may be temporarily stored at the frontend queue 510 while the firmware 515 executes other operations (e.g., read commands, maintenance operations). As described herein with reference to FIG. 6, the firmware 515 may transmit an indication of completion of the access operation (e.g., an indication of completion of the access operation associated with the first read command) to the host system 505 based on an interface of the backend queue 520 being operated in an interrupt mode or a polling mode.

At 547, the host system 505 may transmit a second read command to the frontend queue 510. The second read command may be for data that is stored to the storage memory 525. In some examples, the second read command may be received while additional commands or maintenance operations are being executed. For example, the second read command may be received by the frontend queue 510 while the other read or write commands (not shown) are being executed, such that the threshold value is satisfied and the interface is operated (e.g., switched to being operated) in a polling mode.

For example, at 551, the firmware 515 may switch operation of the interface of the frontend queue 510 to a polling mode. Because the interface may have been operating in an interrupt mode, the firmware 515 may transition the interface from operating in the interrupt mode to the polling mode. In some examples, the firmware 515 may transition the interface to operating in the polling mode by ignoring signaling received from the frontend queue 510 (e.g., suppressing an interrupt handler). In other examples, the firmware 515 may transition the interface to operating in the polling mode by sending a message to the frontend queue 510 to switch to the polling mode and suppress transmission of interrupts based on receiving one or more commands. As described herein, the interface may be operating in the interrupt mode or in the polling mode based on one or more metrics. For example, at 551, the firmware 515 may determine that the quantity of commands being executed (e.g., being executed by the firmware 515) satisfies a threshold value (e.g., due to one or more commands or maintenance operations being executed). For exemplary purposes only, the firmware 515 may determine that the quantity of commands being executed satisfies (e.g., meets or exceeds) the threshold value, and the interface may be operated in a polling mode (e.g., the interface may transition to operating in a polling mode from an interrupt mode). Accordingly, the second read command may be processed according to a polling mode.

At 549, the firmware 515 may identify a polling trigger. The polling trigger may be, for example, expiration of a polling timer or completion of one or more operations currently in execution. In some examples, the firmware 515 may communicate with the frontend queue 510 to determine that the second read command is stored to the frontend queue 510 based on polling the frontend queue 510.

At 553, the firmware 515 may fetch one or more commands, including the second read command, from the frontend queue 510. In the polling mode of operation, the firmware 515 may fetch the second read command a duration after the second read command is stored to the frontend queue 510. For example, the second read command may be stored to the frontend queue 510 and, after a triggering event, the firmware 515 may fetch the command (and, in some examples, one or more additional commands). The triggering event may include an expiration of a timer or an execution of a command other than the second read command.

In the event that the triggering event is the expiration of a timer, the memory system 508 (e.g., a memory controller of the memory system 508) may include a timer configured to be set to a predefined duration. The timer may be initiated upon a polling operation. When the timer expires, the firmware 515 may perform another polling operation. When a new command is in frontend queue 510, the firmware 515 may fetch and execute at least a portion of the stored command(s) (e.g., the second read command). In the event that the triggering event is the execution of command other than the second read command (e.g., an additional command), the firmware 515 may poll and fetch and execute the stored command(s) (e.g., the second read command) upon completing executing the additional command. For example, the second read command may be stored to the frontend queue 510 when the firmware 515 is executing the first read command. When the firmware 515 finishes executing the first read command, the firmware 515 may fetch and execute the second read command from the frontend queue 510. In some examples, the firmware 515 may fetch and execute additional commands (e.g., a plurality of commands) when operating in a polling mode.

At 555, the firmware 515 may transmit a signal to the backend queue 520 to determine a location of data associated with the second read command. For example, the firmware 515 may include one or more locally stored regions of an L2P table. However, an LBA associated with the second read command may not be included in the locally stored region of the L2P table. Accordingly, the firmware 515 may transmit the signal to the backend queue 520 to read a portion of the L2P table stored to the storage memory 525.

At 557, the signal may be communicated from the backend queue 520 to the storage memory 525 to read the portion of the L2P table stored to the storage memory 525. At 559, the storage memory 525 may transmit signaling to the firmware 515 that includes the portion of the L2P table that includes the LBA associated with the second read command. The firmware 515 may use the portion of the L2P table to determine a mapping between the LBA of the second read command and a physical address of the storage memory 525.

At 561, the firmware 515 may transmit a signal to the backend queue 520 to read data from the storage memory 525 based the portion of the L2P table transmitted to the firmware 515 (e.g., at 559). For example, the firmware 515 may transmit a signal to the backend queue 520 for reading a physical location of the storage memory 525 in response to determining a physical address of the data (e.g., determined based on receiving the L2P table at 537). At 563, the signal may be communicated from the backend queue 520 to the storage memory 525 to read the data. Data may be read from the physical address of the storage memory 525 and may be stored (e.g., temporarily stored) to a buffer.

At 565, the read command may be returned to the frontend queue 510 (e.g., a CQ of the frontend queue 510). In some examples, the read command may be stored (e.g., temporarily stored; posted) to the backend queue 520 before being returned to the frontend queue 510. Upon being stored to the backend queue 520, the response may be returned to the frontend queue 510 via the firmware 515. Thus, although the read command is illustrated as being returned from the storage memory 525 to the frontend queue 510 directly (e.g., without any intervening steps), the read command may be returned via the backend queue 520 and/or the firmware 515.

At 567, a response that includes the data read from the storage memory 525 may be transmitted to the host system 505, which may satisfy the second read command. For example, the data may be transmitted to the host system 505 from a buffer (not shown). In some examples, the response may be temporarily stored at the frontend queue 510 while the firmware 515 executes other operations (e.g., read commands, maintenance operations). As described herein with reference to FIG. 6, an indication of completion of the access operation (e.g., an indication of completion of the access operation associated with the second read command) may be transmitted from the backend queue 520 to the host system 505 based on an interface of the backend queue 520 being operated in an interrupt mode or a polling mode. By utilizing both interrupt and polling, a memory system that performs illustrated by the process flow diagram 500 may reduce the time consumed for managing polling or interrupt event management, and thus take advantage of the low-latency of the memory devices associated with the memory system.

Figure 6:
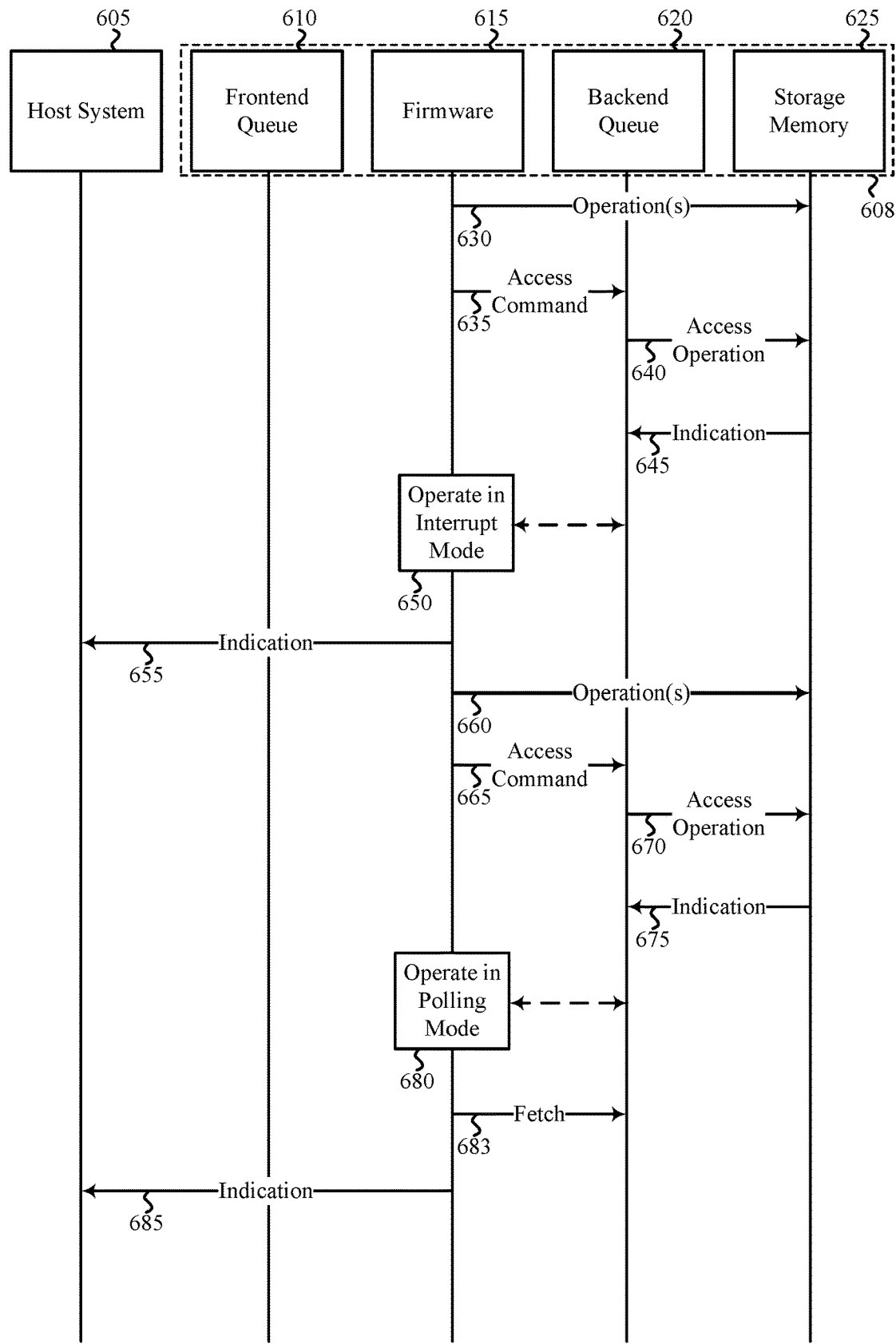

FIG. 6 illustrates an example of a process flow diagram 600 that supports event management for memory devices in accordance with examples as disclosed herein. In some examples, the process flow diagram 600 may illustrate one or more operations performed by a host system 605 and a memory system 608 including a frontend queue 610, firmware 615, a backend queue 620, and storage memory 625. The host system 605, the frontend queue 610, the firmware 615, the backend queue 620, and the storage memory 625 may be examples of the host system 505, the frontend queue 510, the firmware 515, the backend queue 520, and the storage memory 525 as described with reference to FIG. 5. The process flow diagram 600 may illustrate operating an interface of the frontend queue 610 or an interface of the backend queue 620 in a polling mode or in an interrupt mode. The firmware 615 may be configured to switch the interface between an interrupt mode and a polling mode, which may reduce the time consumed by the associated memory system, and thus take advantage of the low latency of the storage memory 625 (e.g., the low latency of the memory devices associated with the storage memory 625).

At 630, the firmware 615 may resume performing one or more operations on the storage memory 625. As described herein, the firmware 615 may perform operations such as access operations, wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 605 and physical addresses (e.g., physical block addresses) associated with memory cells within the storage memory 625.

At 635, the firmware 615 may transmit a signal to the backend queue 620 to perform a first access operation on the storage memory 625 (e.g., to read first data from the storage memory 625) based on a physical location of data stored to the storage memory 625. For example, the physical location of the data may have been determined based on the firmware receiving a portion of a L2P table stored to the storage memory 625 (e.g., at 537 as described with reference to FIG. 5). At 640, the signal may be communicated from the backend queue 620 to the storage memory 625 to access the data.

At 645, an indication of completion of the first access operation may be communicated from the storage memory 625 to the backend queue 620, and the indication may be stored (e.g., temporarily stored) to the backend queue 620. As described herein, when an access operation is performed on one or more memory cells of the storage memory 625, an indication of completion of the access operation may be communicated to the host system 605. For example, the indication of whether the access operation was successfully completed may be communicated to the host system 605 in addition to data associated with accessing the storage memory 625 (e.g., data read from the storage memory 625). The indication may be stored to the backend queue 620 before being transmitted, and may be processed for transmission according to an interrupt mode or a polling mode (e.g., according to whether an interface of the backend queue 620 is operating in an interrupt mode or in a polling mode).

At 650, the firmware 615 may determine to operate an interface associated with the backend queue 620 in an interrupt mode. The firmware 615 may determine to operate the interface in the interrupt mode based on determining that a quantity of LBAs that are the subject of I/O commands in execution (e.g., in execution by firmware 615) does not satisfy (e.g., does not meet or exceed) a threshold value. As described herein, when the interface is operated in an interrupt mode, the firmware 615 may suspend (e.g., temporarily suspend) one or more operations being performed (e.g., at 630) on the storage memory 625. When the operations are suspended, the firmware 615 may determine how to handle the interrupt. For example, the firmware 615 may transmit the indication to the host system 605 before resuming the operations, or may resume a portion of the operations and process the indication for transmission to the host system 605 in parallel (e.g., as a concurrently executing process).

At 655, upon suspending the operation(s), the firmware 615 may transmit the indication of completion of the first access operation (e.g., the indication of completion stored to the backend queue 620 at 645) to the host system 605. If, based on operating the interface in an interrupt mode, the operation(s) have not resumed being performed, the firmware 615 may resume performing the operations after transmitting the indication to the host system 605.

At 660, the firmware 615 may resume performing one or more operations on the storage memory 625 if the operations were not previously resumed. As described herein, the firmware 615 may perform operations such as access operations, wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 605 and physical addresses (e.g., physical block addresses) associated with memory cells within the storage memory 625.

At 665, the firmware 615 may transmit a signal to the backend queue 620 to perform a second access operation on the storage memory 625 (e.g., to read second data from the storage memory 625) based on a physical location of data stored to the storage memory 625. For example, the physical location of the data may have been determined based on the firmware receiving a portion of a L2P table stored to the storage memory 625 (e.g., at 559 as described with reference to FIG. 5). At 670, the signal may be communicated from the backend queue 620 to the storage memory 625 to read the data.

At 675, an indication of completion of the second access operation may be communicated from the storage memory 625 to the backend queue 620, and the indication may be stored (e.g., temporarily stored) to the backend queue 620. As described herein, when an access operation is performed on one or more memory cells of the storage memory 625, an indication of completion of the access operation may be communicated to the host system 605. For example, an indication of whether the access operation was successfully completed may be communicated to the host system 605 in addition to data associated with accessing the storage memory 625 (e.g., data read from the storage memory 625). The indication may be stored to the backend queue 620 before being transmitted, and may be processed for transmission according to an interrupt mode or a polling mode (e.g., according to whether an interface of the backend queue 620 is operating in an interrupt mode or in a polling mode).

At 680, the firmware 615 may determine to operate an interface associated with the backend queue 620 in a polling mode. The firmware 615 may determine to operate the interface in the polling mode based on determining that a quantity of LBAs that are the subject of I/O commands in execution (e.g., in execution by firmware 615) satisfies (e.g., meets or exceeds) a threshold value. At 683, when the interface is operated in a polling mode, the firmware 615 may continue performing operations (e.g., the operations performed at 660) and may periodically retrieve any indications from the backend queue 620 to process the indication to transmit to the host system 605. In some examples, the firmware 615 may retrieve indications (e.g., fetch the indication of completion of the second access operation) based on one or more triggering events. For example, the firmware 615 may perform polling and fetch indications from the backend queue 620 upon the expiration of a timer (e.g., a polling timer). The polling timer may be initiated upon completion of prior polling operations. Additionally or alternatively, polling may be performed upon completion of access or maintenance operations (e.g., a third access operation performed on the storage memory 625).

At 685, upon retrieving the indication of completion of the second access operation from the backend queue 620 (e.g., via the backend queue 620 posting the completion to the frontend queue 610), the firmware 615 may transmit the indication of completion of the second access operation to the host system 605. By utilizing both interrupt and polling, a memory system that performs illustrated by the process flow diagram 600 may reduce the time consumed for managing polling or interrupt event management, and thus take advantage of the low-latency of the memory devices associated with the memory system.

Figure 7:
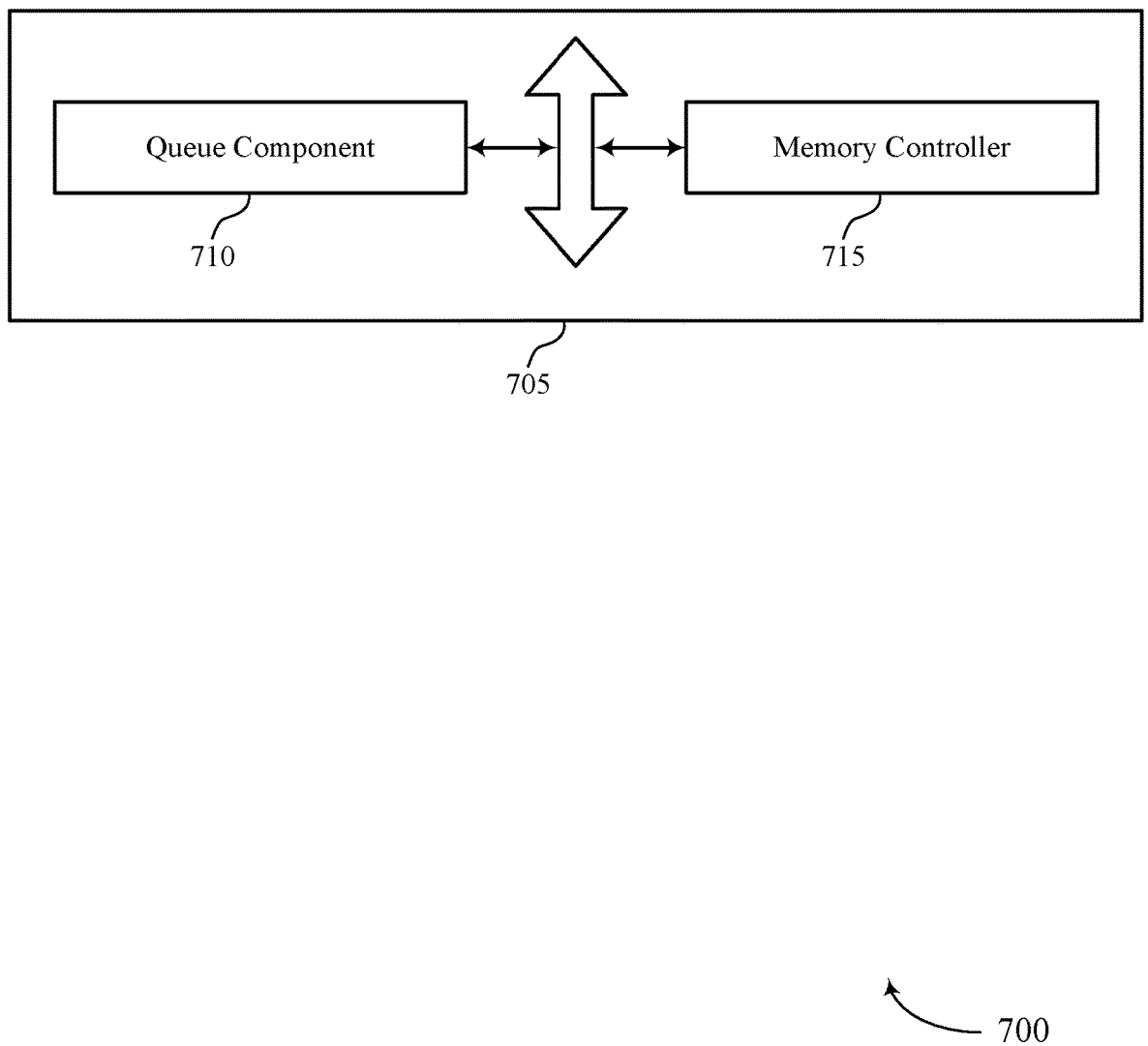
FIG. 7 shows a block diagram of a memory device that supports event management for memory devices in accordance with aspects of the present disclosure.

FIG. 7 shows a block diagram 700 of a memory device 705 that supports event management for memory devices in accordance with examples as disclosed herein. The memory device 705 may be an example of aspects of a memory device as described with reference to FIGS. 3 through 6. The memory device 705 may include a queue component 710 and a memory controller 715. Each of these modules may communicate, directly or indirectly, with one another (e.g., via one or more buses).

The queue component 710 may receive an indication associated with a command.

The memory controller 715 may determine whether a metric of active commands associated with one or more memory devices satisfies a threshold value based on receiving the indication associated with the command. In some examples, the memory controller 715 may operate an interface coupled with the queue in an interrupt mode or a polling mode based on whether the metric of active commands satisfies the threshold value.

In some examples, the memory controller 715 may determine that the quantity of commands associated with access operations on the one or more memory devices does not satisfy the threshold value. In some examples, the memory controller 715 may operate the interface in the interrupt mode based on determining that the quantity of commands associated with access operations on the one or more memory devices does not satisfy the threshold value.

In some examples, the memory controller 715 may determine that the quantity of commands associated with access operations on the one or more memory devices satisfies the threshold value. In some examples, the memory controller 715 may operate the interface in the polling mode based on determining that the quantity of commands associated with access operations on the one or more memory devices satisfies the threshold value.

In some examples, the memory controller 715 may determine that the quantity of active logical block addresses does not satisfy the threshold value. In some examples, the memory controller 715 may operate the interface in the interrupt mode based on determining that the quantity of active logical block addresses does not satisfy the threshold value.

In some examples, the memory controller 715 may determine that the quantity of active logical block addresses satisfies the threshold value. In some examples, the memory controller 715 may operate the interface in the polling mode based on determining that the quantity of active logical block addresses satisfies the threshold value.

Figure 8:
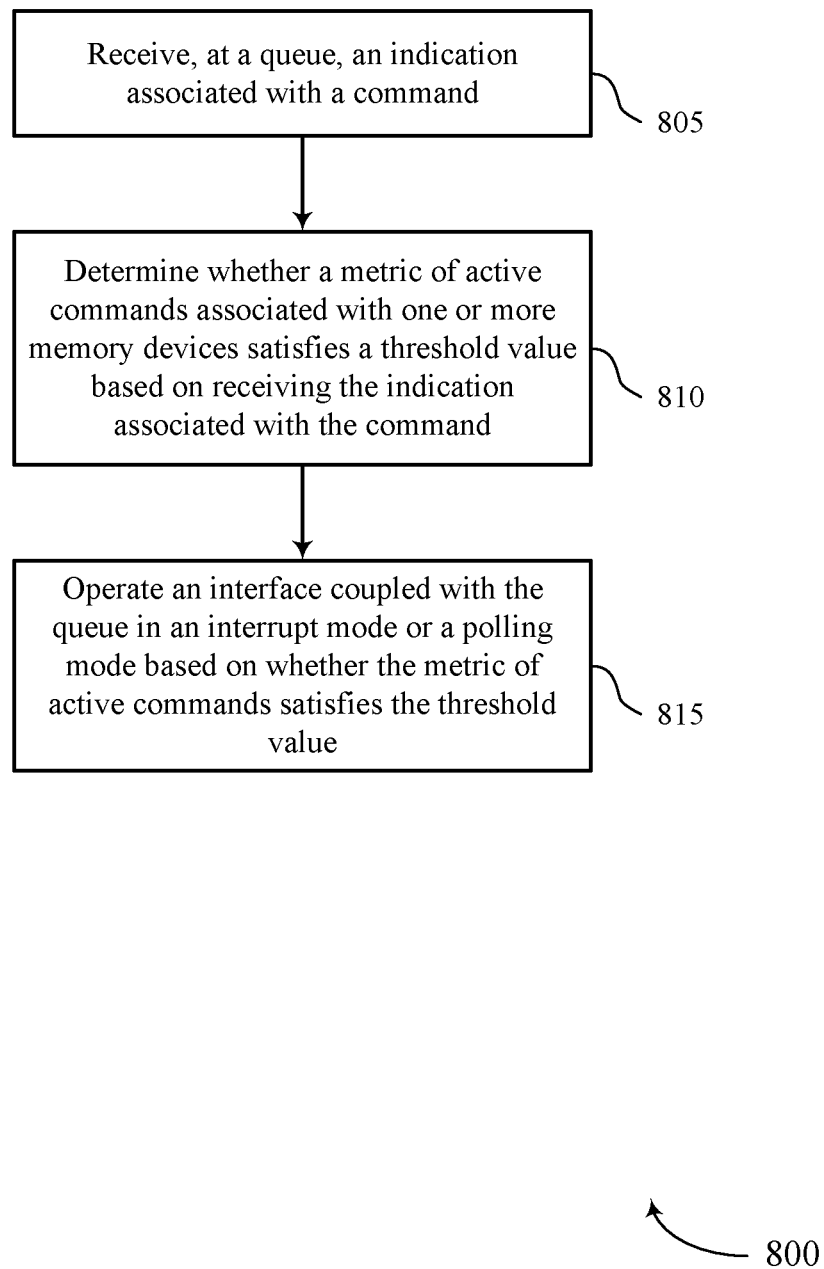
FIG. 8 shows a flowchart illustrating a method or methods that support event management for memory devices in accordance with examples as disclosed herein.

FIG. 8 shows a flowchart illustrating a method or methods 800 that supports event management for memory devices in accordance with aspects of the present disclosure. The operations of method 800 may be implemented by a memory device or its components as described herein. For example, the operations of method 800 may be performed by a memory device as described with reference to FIG. 7. In some examples, a memory device may execute a set of instructions to control the functional elements of the memory device to perform the described functions. Additionally or alternatively, a memory device may perform aspects of the described functions using special-purpose hardware.

At 805, the memory device may receive, at a queue, an indication associated with a command. The operations of 805 may be performed according to the methods described herein. In some examples, aspects of the operations of 805 may be performed by a queue component as described with reference to FIG. 7.

At 810, the memory device may determine whether a metric of active commands associated with one or more memory devices satisfies a threshold value based on receiving the indication associated with the command. The operations of 810 may be performed according to the methods described herein. In some examples, aspects of the operations of 810 may be performed by a memory controller as described with reference to FIG. 7.

At 815, the memory device may operate an interface coupled with the queue in an interrupt mode or a polling mode based on whether the metric of active commands satisfies the threshold value. The operations of 815 may be performed according to the methods described herein. In some examples, aspects of the operations of 815 may be performed by a memory controller as described with reference to FIG. 7.

In some examples, an apparatus as described herein may perform a method or methods, such as the method 800. The apparatus may include features, means, or instructions (e.g., a non-transitory computer-readable medium storing instructions executable by a processor) for receiving, at a queue, an indication associated with a command, determining whether a metric of active commands associated with one or more memory devices satisfies a threshold value based on receiving the indication associated with the command, and operating an interface coupled with the queue in an interrupt mode or a polling mode based on whether the metric of active commands satisfies the threshold value.

In some examples, the metric of active commands may include a quantity of commands associated with access operations of one or more memory devices and the method 800 and the apparatus described herein may further include operations, features, means, or instructions for determining that the quantity of commands associated with access operations on the one or more memory devices does not satisfy the threshold value, and operating the interface in the interrupt mode based on determining that the quantity of commands associated with access operations on the one or more memory devices does not satisfy the threshold value.

In some examples, the metric of active commands may include a quantity of commands associated with access operations on one or more memory devices and the method 800 and the apparatus described herein may further include operations, features, means, or instructions for determining that the quantity of commands associated with access operations on the one or more memory devices satisfies the threshold value, and operating the interface in the polling mode based on determining that the quantity of commands associated with access operations on the one or more memory devices satisfies the threshold value.

In some examples, the metric of active commands may include a quantity of active logical block addresses associated with one or more access operations being executed and the method 800 and the apparatus described herein may further include operations, features, means, or instructions for determining that the quantity of active logical block addresses does not satisfy the threshold value, and operating the interface in the interrupt mode based on determining that the quantity of active logical block addresses does not satisfy the threshold value.

In some examples, the metric of active commands may include a quantity of active logical block addresses associated with one or more access operations being executed and the method 800 and the apparatus described herein may further include operations, features, means, or instructions for determining that the quantity of active logical block addresses satisfies the threshold value, and operating the interface in the polling mode based on determining that the quantity of active logical block addresses satisfies the threshold value.

It should be noted that the methods described above describe possible implementations, and that the operations and the steps may be rearranged or otherwise modified and that other implementations are possible. Further, portions from two or more of the methods may be combined.

A system is described. The system may include one or more memory devices, a queue configured to receive, from a host device, a first command associated with an access operation of the one or more memory devices, and a controller coupled with the one or more memory devices and the queue, the controller configured to determine whether a quantity of commands associated with access operations of the one or more memory devices that are being executed by the controller satisfies a threshold value based on receiving the first command and operate an interface coupled with the queue and the controller in an interrupt mode or a polling mode based on whether the quantity of commands to access the one or more memory devices that are being executed by the controller satisfies the threshold value.

Some examples may further include determining that the quantity of commands associated with the access operations of the one or more memory devices does not satisfy the threshold value, and operate the interface in the interrupt mode based on determining that the quantity of commands associated with the access operations of the one or more memory devices does not satisfy the threshold value.

Some examples may further include receiving, from the queue, an interrupt associated with the first command, suspend executing a second command being performed on the one or more memory devices based on operating the interface in the interrupt mode and receiving the interrupt, and execute the first command to access the one or more memory devices based on suspending execution of the second command.

Some examples may further include resume executing the second command based on executing the first command to access the one or more memory devices.

Some examples may further include determining that the quantity of commands associated with the access operations of the one or more memory devices satisfies the threshold value, and operate the interface in the polling mode based on determining that the quantity of commands associated with the access operations of the one or more memory devices satisfies the threshold value.

Some examples may further include fetch the first command from the queue based on operating the interface in the polling mode, where the first command may be fetched based on a trigger condition for the polling mode, and execute the first command based on fetching the first command from the queue.

In some examples, the trigger condition includes expiration of a polling timer.

In some examples, the trigger condition includes completion of execution of a second command.

A system is described. The system may include one or more memory devices, a queue configured to receive an indication of completion of an access operation on the one or more memory devices, and a controller coupled with the one or more memory devices and the queue, the controller configured to identify a quantity of active logical block addresses associated with one or more access operations being executed by the controller, determine whether the quantity of active logical block addresses satisfies a threshold value based on identifying the quantity of active logical block addresses associated with the one or more access operations being executed by the controller, and operate an interface coupled with the queue and the controller in an interrupt mode or a polling mode based on whether the quantity of active logical block addresses satisfies the threshold value.

Some examples may further include determining that the quantity of active logical block addresses does not satisfy the threshold value, and operate the interface in the interrupt mode based on determining that the quantity of active logical block addresses does not satisfy the threshold value.

Some examples may further include receiving, from the queue, an interrupt associated with the indication of completion of the access operation on the one or more memory devices while the interface may be operating in the interrupt mode, suspend executing an operation being performed on the one or more memory devices based on receiving the interrupt associated with the indication of completion of the access operation on the one or more memory devices while the interface may be operating in the interrupt mode, and transmit, to a host device, the indication of completion of the access operation on the one or more memory devices based on suspending executing the operation being performed on the one or more memory devices.

Some examples may further include resume executing the operation based on transmitting the indication of completion of the access operation on the one or more memory devices to the host device.

Some examples may further include determining that the quantity of active logical block addresses satisfies the threshold value, and operate the interface in the polling mode based on determining that the quantity of active logical block addresses satisfies the threshold value.

Some examples may further include fetch the indication of completion of the access operation on the one or more memory devices from the queue based on operating the interface in the polling mode and a trigger condition for the mode, and transmit, to a host device, the indication of completion of the access operation on the one or more memory devices based on fetching the indication of completion of the access operation on the one or more memory devices from the queue.

In some examples, the trigger condition includes expiration of a polling timer or receiving a second an indication of completion of an access operation on the one or more memory devices.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "if," "when," "based on," "based at least in part on," and "in response to," may be used interchangeably. In some examples, if the terms "if," "when," "based on," "based at least in part on," and "in response to," are used to describe a conditional action or connection between portions of a process, the terms may be interchangeable. In some examples, if used to describe a conditional action or process, the terms "if," "when," "based on," "based at least in part on," and "in response to" may be interchangeable.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A memory system, comprising:
   one or more memory devices; and
   a controller coupled with the one or more memory devices, the controller configured to:
   receive a read command associated with a read operation of the one or more memory devices;
   selecting to operate an interface coupled with the controller in a polling mode based at least in part on receiving the read command; and
   processing the read command according to the polling mode based at least in part on selecting to operate in the polling mode.

2. The memory system of claim 1, wherein the controller is configured to:
   determine that a quantity of commands being executed on the one or more memory devices fails to satisfy a threshold value based at least in part on receiving the read command; and
   operate the interface in an interrupt mode based at least in part on determining that the quantity of commands being executed fails to satisfy the threshold value.

3. The memory system of claim 2, wherein the controller is configured to:
   suspend executing a portion of the quantity of commands being executed on the one or more memory devices based at least in part on operating in the interrupt mode.

4. The memory system of claim 1, wherein the controller is configured to:
   read a portion of a logical to physical table stored in a portion of the one or more memory devices based at least in part on receiving the read command; and
   determine a location associated with the read command based at least in part on reading the portion of the logical to physical table based at least in part on selecting to operate the interface coupled with the controller in the polling mode.

5. The memory system of claim 4, wherein the controller is configured to:
   determine a mapping between a logical block address of the read command and a physical address of potion of the one or more memory devices based at least in part on reading the portion of the logical to physical table, wherein processing the read command according to the polling mode is based at least in part on determining the mapping.

6. The memory system of claim 1, wherein the controller is configured to:
   operate the interface in the polling mode based at least in part on selecting to operate the interface in the polling mode; and
   identify a polling trigger based at least in part on operating the interface in the polling mode, wherein processing the read command according to the polling mode is based at least in part on identifying the polling trigger.

7. The memory system of claim 6, wherein the controller is configured to:
initiate a polling timer associated with the polling mode based at least in part on selecting to operate the interface in the polling mode; and
identify an expiration of the polling timer after initiating the polling timer, wherein identifying the polling trigger is based at least in part on identifying the expiration of the polling timer.

8. The memory system of claim 6, wherein the controller is configured to:
identify a completion of one or more operations in execution on the one or more memory devices based at least in part on selecting to operate the interface in the polling mode, wherein identifying the polling trigger is based at least in part on identifying the completion of the one or more operations in execution on the one or more memory devices.

9. A memory system, comprising:
one or more memory devices; and
a controller coupled with the one or more memory devices, the controller configured to:
transmit, to a queue associated with the one or more memory devices, a first access command associated with a first access operation of the one or more memory devices;
receive, from the queue, an interrupt associated with an indication of completion of the first access operation on the one or more memory devices based at least in part on the first access command; and
process, for transmission to a host system, the indication of completion of the first access operation on the one or more memory devices according to a polling mode based at least in part on receiving the interrupt associated with the indication of completion of the first access operation on the one or more memory devices.

10. The memory system of claim 9, wherein the controller is configured to:
determine that a quantity of logical block addresses fails to satisfy a threshold value based at least in part on transmitting the first access command; and
determine to operate an interface associated with the queue in an interrupt mode based at least in part on determining that the quantity of logical block addresses fails to satisfy the threshold value.

11. The memory system of claim 10, wherein the controller is configured to:
suspend executing an operation being performed on the one or more memory devices based at least in part on determining to operate in the interrupt mode.

12. The memory system of claim 11, wherein the controller is configured to:
transmit, to the host system, the indication of completion of the first access operation on the one or more memory devices based at least in part on suspending executing the operation being performed on the one or more memory devices.

13. The memory system of claim 12, wherein the controller is configured to:
resume executing the operation based at least in part on transmitting the indication of completion of the first access operation on the one or more memory devices.

14. The memory system of claim 9, wherein the controller is configured to:
transmit, to the queue, a second access command associated with a second access operation of the one or more memory devices based at least in part on receiving the interrupt associated with the indication of completion of the first access operation on the one or more memory devices; and
receive, from the queue, an interrupt associated with an indication of completion of the second access operation on the one or more memory devices based at least in part on the second access command.

15. The memory system of claim 14, wherein the controller is configured to:
determine that a quantity of logical block addresses satisfies a threshold value based at least in part on transmitting the second access command; and
determine to operate an interface associated with the queue in the polling mode based at least in part on determining that the quantity of logical block addresses satisfies the threshold value, wherein processing the indication of completion of the first access operation according to the polling mode is based at least in part determining to operate in the polling mode.

16. The memory system of claim 15, wherein the controller is configured to:
retrieve the indication of competition for the second access operation on the one or more memory devices from the queue based at least in part on operating the interface in the polling mode, wherein the indication of competition for the second access operation on the one or more memory devices is fetched based at least in part on an expiration of a polling timer.

17. A memory system, comprising:
one or more memory devices; and
a controller coupled with the one or more memory devices, the controller configured to:
receive an indication associated with a command;
operate an interface coupled with the controller in an interrupt mode based at least in part on receiving the indication;
identify a trigger condition to switch from operating in the interrupt mode to operating in a polling mode; and
operate the interface in the polling mode based at least in part on identifying the trigger condition.

18. The memory system of claim 17, wherein the controller is configured to:
determine that a quantity of logical block addresses associated with access operations being executed on the one or more memory devices satisfies a threshold value based at least in part on receiving the indication associated with the command, wherein identifying the trigger condition comprises determining that the quantity satisfies the threshold value.

19. The memory system of claim 17, wherein the controller is configured to:
determine that a quantity of commands associated with access operations of the one or more memory devices that are being executed by the controller satisfies a threshold value based at least in part on receiving the command associated with an access operation of the one or more memory devices, wherein identifying the trigger condition comprises determining that the quantity satisfies the threshold value.

20. The memory system of claim 17, wherein the controller is configured to:
retrieve an indication of completion of one or more access operations on the one or more memory devices based at least in part on operating the interface in the polling mode and identifying the trigger condition.

* * * * *